Figure 1:
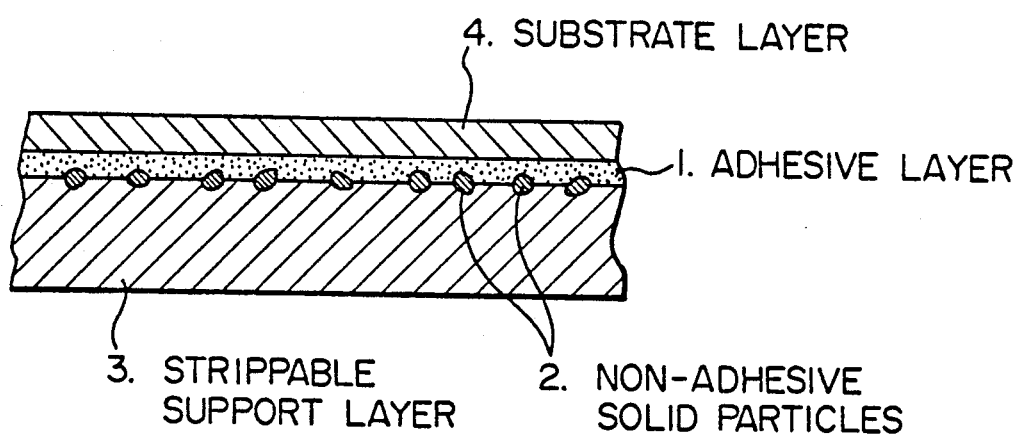

United States Patent [19]

Ochi et al.

[11] Patent Number: 5,008,139

[45] Date of Patent: Apr. 16, 1991

[54] PRESSURE-SENSITIVE ADHESIVE LAYER

[75] Inventors: Katsura Ochi; Yasuaki Oonishi; Kazuhisa Kinsen, all of Uozu, Japan

[73] Assignee: Nippon Carbide Kogyo Kabushiki Kaisha, Tokyo, Japan

[21] Appl. No.: 264,784

[22] Filed: Oct. 31, 1988

[30] Foreign Application Priority Data

Oct. 31, 1987 [JP] Japan ................. 62-274640

[51] Int. Cl.$^5$ .............. B32B 5/16; B32B 7/06; B32B 7/12

[52] U.S. Cl. .................. 428/40; 428/323; 428/336

[58] Field of Search ............. 428/40, 144, 323, 325, 428/327, 328, 330, 343, 354, 336

[56] References Cited

U.S. PATENT DOCUMENTS 4,054,697 10/1977 Reed et al. .
4,376,151 3/1983 Parrotta .
4,514,457 4/1985 Sasaki ................. 428/40
4,556,595 12/1985 Ochi ................. 428/343
4,636,432 1/1987 Shibano et al. ................. 428/352

FOREIGN PATENT DOCUMENTS 2294837 11/1975 France .
8705315 9/1987 World Int. Prop. O. .

Primary Examiner—Alexander S. Thomas
Attorney, Agent, or Firm—Sherman and Shalloway

[57] ABSTRACT

A pressure-sensitive adhesive layer having, on at least one surface thereof, a layer of evenly dispersed non-adhesive solid particles having an average particle diameter of 10 to 60 microns, wherein at least about half of the solid particles project from the surface of the adhesive layer to a height corresponding to at least about one-fourth of the average particle diameter of the solid particles and if the solid particles are hollow particles, the walls of the hollow particles are not rupturable by the pressure of bonding. The pressure-sensitive adhesive layer has a very low initial adhesion strength (adhesion strength before press-bonding). After press-bonding, it rapidly develops adhesion strength, and attains a very high final adhesion strength.

4 Claims, 1 Drawing Sheet

PRESSURE-SENSITIVE ADHESIVE LAYER

This invention relates to a pressure-sensitive adhesive layer for use in a pressure-sensitive adhesive sheet structure or the like. More specifically, this invention relates to a pressure-sensitive adhesive layer having a low initial adhesion strength (the adhesion strength of the adhesive layer when it is contacted lightly with the surface of a substrate before pressing; represented by a loop tack to be described hereinafter) which is enough to position the adhesive layer easily at a desired adhesion site on the surface of the substrate and to enable the applied adhesive layer to be relocated, as required, on the surface of the substrate and thus correct adhesion defects such as creasing, foaming and swelling. The adhesive layer after press-bonding develops adhesion strength rapidly and attains a very high final adhesion strength, and after press-bonding, the bonded surface is smooth. The adhesive layer of the invention can be produced very easily.

Pressure-sensitive adhesive sheet-like structures having a pressure-sensitive adhesive layer on the surface of a substrate such as a film, tape or sheet are known, and used widely in various applications, for example in building materials such as wall paper, for masking applications for temporarily masking parts to be coated at the time of repair-coating of vehicles or temporarily masking the surface of aluminum sashes for protection during transportation, and for semipermanent marking applications, for example as background colors, characters and designs of signboards, and decorative patterns, stripes, characters, etc. on vehicles such as autocycles, bicycles and trains or on containers.

When such a pressure-sensitive adhesive layer has an excessively high initial adhesion strength, even an expert worker finds it very difficult to apply it accurately to a desired site of a substrate at the first attempt. It is necessary therefore to correct the site of adhesion or relocate it for removing creases, foams or swellings. Such correction often results in troubles such as the deformation or breakage of the substrate layer.

To solve the above technical problem of the pressure-sensitive adhesive layer, attempts have been made to reduce its initial adhesive strength without substantially decreasing its desirable final adhesion strength.

Japanese Patent Publication No. 3120/1969 discloses a tacky adhesive layer having crushable and collapsible non-adhesive protrusions distributed uniformly on at least one surface. By the technique disclosed in this patent document, minute balloons of urea-formaldehyde resin or glass are distributed on the surface of an adhesive layer to reduce its initial adhesion strength, and when the adhesive layer is applied under pressure, the minute balloons are broken to develop the adhesion strength of the adhesive layer.

Japanese Patent Publication No. 17040/1969 discloses a tacky adhesive layer having small protrusions with a height of about 15 microns and covered with a non-adhesive brittle protective outer coating to a height at least about ¼ of the height of each protrusion distributed on its surface. This adhesive layer can be contacted with a desired site on the surface of a substrate by sliding it over the surface to that site and then simply applying pressure.

However, in these prior techniques, it is difficult to decrease the initial adhesion strength of the adhesive layer to a satisfactory degree without adversely affecting its adhesion strength after pressure-bonding, and if the initial strength is reduced to a satisfactory extent, the adhesion strength of the adhesive layer after press-bonding is affected adversely. The crushable and collapsible minute balloons in Japanese Patent Publication No. 3120/1969 and the non-adhesive brittle outer protective coating in Japanese Patent Publication No. 17040/69 are broken into relatively large fragments at the time of press-bonding. These fragments cannot all be dispersed into the interior of the adhesive layer, but remain on the surface of the adhesive layer. The fragments remaining on the surface greatly prevent the adhesive layers from attaining an increased adhesion strength after press-bonding, and also reduce the smoothness of the surface. Accordingly, a pressure-sensitive adhesive sheet-like structure having such a pressure-sensitive adhesive layer present many problems in the marking applications. Furthermore, in the former, it is virtually difficult to embed some of the minutes balloons in the surface portion of the adhesive layer and disperse the remainder in the projecting state, and such an adhesive layer is difficult to produce industrially. In the latter, the production of the adhesve layer is more difficult and complex.

The present inventors made extensive investigations in order to eliminate the aforesaid defects of the prior art, and proposed in Japanese Laid-Open Patent Publication No. 13682/1983 a pressure-sensitive adhesive layer which has, on or in at least one surface or surface layer thereof, a layer of uniformly dispersed solid particles having a particle diameter less than the thickness of the pressure-sensitive adhesive layer and an average particle diameter of less than 10 microns, the solid particles being difficultly-adhesive and nonhollow. This pressure-sensitive adhesive layer has a considerably low initial adhesion strength and a sufficiently high final adhesion strength after pressure-bonding, and has produced good results in a pressure-sensitive adhesive sheet-like structure for marking applications. But as its utility has been exploited, it has been found that its feature of requiring some time before it develops its adhesion strength after press-bonding becomes detrimental in applications using application tapes.

For example, when a display composed of a plurality of characters such as "TURBO" is to be applied to the surface of a substrate such as an automobile body by using a pressure-sensitive adhesive sheet structure, it is the practice in many cases to cut off the individual letters separately from a marking sheet in the sheet structure, apply the surface substrate layers of these characters on a tackifier layer of weakly tacky paper called an "application tape" and arrange them in a predetermined sequence, peel the release paper from the marking sheet, and apply the application tape onto the surface of the substrate, thereby transferring the desired display from the application tape to the substrate. Sometimes, such a display is directly printed on a tranparent pressure-sensitive adhesive sheet structure. It was found that in such applications using the application tape, if time is required until the adhesive layer after press-bonding develops an adhesion strength, the marking sheet to be transferred remains frequently on the application tape without transfer to the substrate.

The present inventors made investigations in order to provide a pressure-sensitive adhesive layer which offers a solution to all of the aforesaid problems of the prior art, and have now arrived at the present invention.

According to this invention, there is provided a pressure-sensitive adhesive layer having, on at least one surface thereof, a layer of evenly dispersed non-adhesive solid particles having an average particle diameter of 10 to 60 microns, wherein at least about half of the solid particles project from the surface of the adhesive layer to a height corresponding to at least about one-fourth of the average particle diameter of the solid particles, and if the solid particles are hollow particles, the walls of the hollow particles are not rupturable by the pressure of bonding.

The pressure-sensitive adhesive layer, when applied to a substrate as a pressure-sensitive adhesive sheet-like structure, has a low initial adhesion strength which is enough to position the adhesive layer easily at a desired adhesion site on the surface of the substrate and to enable the applied adhesive layer to be relocated, as required, on the surface of the substrate and thereby correct adhesion defects such as creasing, foaming and swelling. Moreover, the adhesion strength of the adhesive layer after press-bonding is developed rapidly. Accordingly, no trouble occurs at a time of transfer when it is applied by using an application tape. The final adhesion strength of the adhesive layer is very high, and the bonded surface is smooth. Furthermore, the adhesive layer of the invention can be easily produced industrially. Because of these various improved features, the pressure-sensitive adhesive layer is very useful in a pressure-sensitive adhesive sheet-like structure, particularly for marking applications.

In the pressure-sensitive adhesive layer of this invention, a dispersed layer in which non-adhesive solid particles having an average particle diameter of 10 to 60 microns, preferably about 10 to 50 microns, most preferably about 15 to 40 microns are evenly dispersed exists on at least one surface of an adhesive layer having a thickness of preferably about 10 to 100 microns, more preferably about 10 to 60 microns, most preferably about 20 to 50 microns. At least about half, preferably at least about 70%, of the solid particles project from the surface of the adhesive layer to a height corresponding to at least about one-fourth, preferably at least about one-third, most preferably at least about two-fifths, of their average particle diameter. If the solid particles are hollow particles, the walls of the hollow particles are not rupturable by the pressure of bonding.

In a preferred embodiment of the present invention, at least about half of the non-adhesive solid particles project from the surface of the adhesive layer to a height of at least about 7 microns, preferably at least about 10 microns.

In the preferred embodiment of this invention, non-adhesive solid particles have an average particle diameter of not more than 1.1 times the thickness of the adhesive layer. The non-adhesive solid particles have such a particle size distribution that at least about 50% by weight of the solid particles have a particle diameter ranging from the average particle diameter minus 5 microns to the average particle diameter plus 5 microns, and at least about 90% by weight of the solid particles have a particle diameter ranging from the average particle diameter minus 8 microns to the average particle diameter plus 8 microns. In a more preferred embodiment, at least about 50% by weight of the non-adhesive solid particles have a particle diameter ranging from the average particle diameter minus 3 microns to the average particle diameter plus 3 microns, and at least about 90% by weight of the solid particles have a particle diameter ranging from the average particle diameter minus 5 microns to the average particle diameter plus 5 microns. In the particle size distributions in the above preferred and more preferred embodiments, the proportion of fine particles having a particle diameter of less than about 10 microns is especially preferably not more than 10% by weight of the entire solid particles.

In the pressure-sensitive adhesive layer of this invention, a layer in which the non-adhesive solid particles having the above particle size conditions are evenly dispersed in at least one surface of the pressure-sensitive adhesive layer. The "evenly dispersed", herein, means evenly dispersed macroscopically. This means that the particles do not have to be regularly and uniformly distributed.

In the preferred embodiment, the ratio of the non-adhesive solid particles covering the surface of the adhesive layer is about 1 to 30%, preferably about 3 to 20%, most preferably about 3 to 18%.

In the more preferred embodiment of the invention, there is provided a pressure-sensitive adhesive layer having, on at least one surface thereof, a layer of evenly dispersed non-adhesive solid particles, wherein at least about half, preferably at least 70%, of non-adhesive solid particles having an average particle diameter of 10 to 60 microns, preferably about 10 to 50 microns, more preferably about 10 to 40 microns, most preferably about 15 to 40 microns, project from the surface of the adhesive layer to a height corresponding to at least about one-fourth, preferably at least about one-third, most preferably about two-fifths, of their average diameter, and the ratio of the dispersed layer covering the surface of the adhesive layer is about 1 to 30%, preferably about 3 to 20%, most preferably about 3 to 18%.

It has been found in accordance with this invention that when the non-adhesive solid particles have (a) the average particle diameter within the specified range and (b) the projecting height within the specified range and the adhesive layer has (c) the covering ratio within the specified range, all of the aforesaid characteristics, such as the lowering of the initial adhesion strength, the rapidity of developing and adhesion strength after press-bonding and the final adhesion strength reached, are improved to a greater extent.

The reason why the pressure-sensitive adhesive layer of this invention exhibits excellent properties is not entirely clear. It is presumed however that since non-adhesive solid particles having a moderate particle diameter project to a moderate height from the surface of the adhesive layer to separate the adhesive layer moderately from the surface of a substrate, the initial adhesion strength of the adhesive layer is very low, and furthermore, since the non-adhesive particles having a moderate particle diameter are evenly dispersed with a moderate covering ratio, the non-adhesive particles are rapidly embedded in the adhesive layer at the time of pressure-bonding and the adhesion strength of the adhesive layer is developed rapidly, and its final adhesion strength reached becomes markedly high.

The non-adhesive solid particles used in this invention are not particularly restricted in type so long as they satisfy the aforesaid particle size conditions.

Examples of the solid particles include inorganic solid particles such as calcium carbonate, barium carbonate, calcium sulfate, aluminum sulfate, molybdenum disulfide, titanium oxide, alumina, silica, magnesium oxide, calcium oxide, calcium hydroxide, ferric oxide, ferrous oxide and glass beads; and organic solid particles such as cured rubber, ebonite, lignin/phenol resin, styrene resin, vinyl chloride resins, (meth)acrylic resins, polypropylene resin, polyethylene resin, melamine resin, urea resin and other resins. They may be used singly or in combination.

Hollow non-adhesive solid particles which satisfy the above particle size conditions may be used so long as their walls are not ruptured by the pressure of bonding. Examples of such hollow non-adhesive solid particles include organic balloons such as urea resin balloons, melamine resin balloons, phenolic resin balloons, polyvinylidene balloons and epoxy resin balloons; and inorganic balloons such as glass balloons, "sirasu" balloons, carbon balloons, alumina balloons, and silica balloons.

The term "not ruptured or not rupturable", as used herein, means that the walls of the hollow particles are not ruptured even partly so that no leakage of the gas from the hollow particle will occur.

The broken fragments of the hollow particles at the surface of the adhesive layer cause a reduction in the final adhesion strength reached of the adhesive layer, as stated hereinabove. In the event that the walls of the hollow particles are partly broken after the pressure-bonding and the gas inside is enclosed between the substrate layer and the substrate, the enclosed gas is expanded when a clear lacquer is coated after the bonding and is heated for drying. Swelling therefore occurs on the surface of the marking sheet to give a degraded surface.

Methyl methacrylate resin particles, urea resin balloons, melamine resin balloons, phenolic resin balloons, glass beads, and glass balloons are used preferably as the non-adhesive solid particles or the non-adhesive hollow solid particles.

On the other hand, various adhesives are known as the pressure-sensitive adhesive forming the pressure-sensitive adhesive layer of the invention. It is preferable to utilize adhesives of the type generally called a tackifier. They may, for example, be rubber-type adhesives, acrylic adhesive, vinyl acetate type adhesive, urethane-type adhesives, silicone adhesives, and other adhesives, and mixtures of these.

Examples of the rubber-type adhesives include those which comprise at least one of natural rubber, isoprene rubber, styrene/butadiene rubber, styrene/ butadiene block copolymer, butyl rubber, polyisobutylene, silicone rubber, polyvinyl isobutyl ether, chloroprene rubber and nitrile rubbers as a main ingredient, and mixtures of these. Rubbers having some crosslinked structure between the molecules may also be used preferably.

The acrylic adhesives and vinyl acetate adhesives are preferably solvent-type adhesives comprising unsaturated carboxylic ester-type copolymers as a main component. An especially preferred is a solvent-type adhesive composed of 100 parts by weight of a copolymer having a glass transition temperature (Tg) of less than $-20°$ C. derived from 99.9 to 95% by weight of an unsaturated carboxylic acid ester monomer and 0.1 to 15% by weight of a vinyl monomer having a crosslinkable functional group, 70 to 400 parts by weight of a solvent and 0.01 to 20 parts by weight of a crosslinking agent capable of crosslinking the crosslinkable functional group.

Examples of the unsaturated carboxylic acid ester monomer for obtaining the copolymer include (meth)acrylate esters such as methyl (meth)acrylate, ethyl (meth)acrylate, butyl (meth)acrylate, pentyl (meth)acrylate, hexyl (meth)acrylate, heptyl (meth)acrylate and octyl (meth)acrylate, and vinyl esters such as vinyl acetate and vinyl propionate.

Examples of the vinyl monomer having a crosslinkable functional group for obtaining the above copolymer include carboxyl-containing vinyl monomers such as acrylic acid, methacrylic acid and itaconic acid, and hydroxyl-containing vinyl monomers such as hydroxymethyl, hydroxyethyl, hydroxypropyl, hydroxybutyl, hydroxypentyl and hydroxyhexyl acrylates and hydroxymethyl, hydroxyethyl, hydroxybutylethyl, hydroxypropyl, hydroxypentyl and hydroxyhexyl methacrylates. Vinyl monomers containing an epoxy group and an amino group may also be cited.

Ethyl acetate, toluene, acetone and isopropyl alcohol are preferred as the solvent.

The crosslinking agent may be, for example, an organic polyisocyanate. Specific examples of the organic polyisocyanate are aromatic polyisocyanates such as p-phenylene diisocyanate, 4,4'-diphenylmethane diisocyanate, 2,4-tolylene diisocyanate, 2,6-tolylene diisocyanate, xylylene diisocyanate, triisocyanate, isophorone diisocyanate and naphthalene-1,5-diisocyanate; and aliphatic polyisocyanates such as pentamethylene diisocyanate, hexamethylene diisocyanate and 4,4'-dicyclohexyl methane diisocyanate.

The glass transition temperature Tg of the copolymer is determined by the following method.

About 10 mg of a sample resin solution is weighed into a cell, and dried at 100° C. for 2 hours. The dried product is used as a measuring sample, and heated from $-80°$ C. at a temperature elevating rate of 20° C./min. by a differential scanning calorimeter using a nitrogen gas as a carrier gas at a flow rate of 20 cc/ min. Thus, the glass transition temperature is measured.

Examples of the urethane-type adhesives include polymeric compounds obtained by the reaction of isocyanates such as triphenylmethane-p,p',p"-triisocyanate, hexamethylene diisocyanate, diphenylmethane-4,4'-diisocyanate and toluene diisocyanate with compounds having active hydrogen atoms such as polyesters, polyether glycols, polyacrylates and polyamides having active hydrogen atoms, mixtures of these polymeric compounds, or mixtures containing at least one of such polymeric compounds as a main ingredient.

The method of producing the pressure-sensitive adhesive layer of this invention is not particularly limited. Preferably, it is prepared by a method which comprises evenly dispersing the non-adhesive solid particles having an average particle diameter of 10 to 60 microns in at least one surface of a strippable support layer, pressing the solid particles into the support layer so that at least about half of the solid particles are embedded in the support layer to a depth corresponding to at least about one-fourth of their average particle diameter, and forming an adhesive layer on the surface of the support layer in which the solid particles are dispersed and pressed.

The strippable support layer used in the above preferred method may be, for example, a strippable sheet obtained by laminating polyethylene to the surface of high-quality paper and reacting the polyethylene layer with a silicone, a polypropylene film treated with a silicone, or a polyethylene film treated with a silicone.

There is no particular restriction on the means by which the non-adhesive solid particles are evenly dispersed in the surface of the support layer, and any means of dispersing and applying a powder, such as a powder scattering machine or a powder spraying machine can be utilized. There can also be utilized a method by which a slurry of the solid particles in a suitable dispersing medium is applied to the surface of the support layer by coating, spraying or the like and then dried and a method by which an excessive amount of the solid particles are distributed and the excess of the particles are removed by a brush or a similar scraper means.

The support layer in which the non-adhesive solid particles are evenly dispersed is, after optionally being heated, subjected to a suitable pressurizing means such as a press roll and a press to embed the solid particles in the support layer to the desired depth, and a pressure-sensitive adhesive is applied to the surface by such means as coating or lamination to provide the pressure-sensitive adhesive layer of the invention.

The pressure-sensitive adhesive layer of this invention can be used preferably in a pressure-sensitive sheet-like structure.

Thus, according to this invention, there is also provided a pressure-sensitive adhesive sheet-like structure comprising (A) a pressure-sensitive adhesive layer having, on at least one surface thereof, a layer of evenly dispersed non-adhesive solid particles having an average particle diameter of 10 to 60 microns, wherein at least about half of the solid particles project from the surface of the adhesive layer to a height corresponding to at least about one-fourth of the average particle diameter of the solid particles, and if the solid particles are hollow particles, the walls of the hollow particles are not rupturable by the pressure of bonding, (B) a strippable support layer contacting the projecting portions of the non-adhesive solid particles on the surface of the adhesive layer and having depressions on the surface intimately receiving the projecting portions of the solid particles, and (C) a substrate layer laminated to that surface of the pressure-sensitive adhesive layer which does not have the layer of the dispersed solid particles.

The pressure-sensitive sheet-like structure exhibits its advantage to a maximum extent particularly in marking sheet applications.

FIG. 1 shows a schematic view in section of the pressure-sensitive adhesive sheet-like structure provided by this invention.

The substrate layer may be, for example, a thermoplastic polymer film having a thickness of about 100 to 1000 microns, preferably about 20 to 200 microns, and more preferably about 25 to 100 microns. Examples of such a polymeric film are films of polyethylene, polypropylene, vinyl chloride polymers, vinyl acetate polymers, acrylic polymers, urethane polymers and polyesters, either singly or as a blend.

Kraft paper, high-quality paper and glassine paper may also be cited as examples of the substrate layer.

As required, the substrate layer may contain various additives such as a coloring agent, a stabilizer, a modifier and a plasticizer. Various prints may be applied to the surface of the substrate layer.

The substrate layer may be laminated to the pressure-sensitive adhesive layer by, for example, a pressure-bonding laminating method.

The average particle diameter of the non-adhesive solid particles is measured by the following method.

The solid particles are photographed under a microscope at a magnification of 300. In the resulting photo, the maximum diameters of fifty individual particles (particles under $0.3\mu$ in diameter are ignored), are actually measured. The volume average value of the measured maximum diameters is calculated by the following equation and defined as the average particle diameter of the solid particle.

$$\text{Volume average value} = \sqrt[3]{\frac{\sum\limits_{n=1}^{50} (l_n)^3}{50}}$$

where $\lambda_n$ is the maximum diameter, and n is 1 to 50.

The projecting height of the solid particles from the surface of the adhesive layer, as used in this specification, is measured by the following method.

When the adhesive sheet structure has a strippable support layer contacting the projecting portions of the non-adhesive solid particles from the surface of the adhesive layer and having depressions on the surface intimately receiving the projecting portion, a replica of the depressions of the support layer is taken. When it has no support layer, a replica is taken of that surface of the solid particles from which the solid particles project. The depths of the central portions of the depressions in the replica are measured by a surface roughness tester (Surfcorder SE-30D, made by K. K. Kosaka Kenkyusho).

The average of the depths of ten depressions is defined as the projecting length of the solid particles.

The ratio of the solid particles covering the surface of the adhesive layer is measured by the following method.

With respect to samples taken at random from the adhesive layer with an area of 1 m², that surface of the adhesive layer from which the solid particles project is photographed. The area occupied by the solid particles is measured within an area of $10\times 10$ cm (at a modification of 300) of the photographs, and the percentage of this area based on the total area of the surface of the adhesive layer is calculated. The average of the percentages obtained in the ten samples is defined as the ratio of covering.

The pressure-sensitive adhesive layer of the invention has a sufficiently low initial adhesion strength and yet develops adhesion strength rapidly after press-bonding and attains a markedly high final adhesion strength. When it is utilized in a pressure-sensitive adhesive sheet-like structure, the surface of the substrate after application is smooth and beautiful and has high adhesion strength after contact with water and gasoline. Furthermore, when a clear paint is applied to the substrate after bonding and then dried, no blister occurs. Another advantage of the invention is that the pressure-sensitive adhesive layer can be very easily produced industrially.

The following examples illustrate the present invention specifically in more detail. Unless otherwise specified, all quantities given in the examples are by weight.

The tests in these examples were conducted by the following methods.

(1) Loop tack

This was tested by using Strograph M-50 made by K. K. Toyo Seiki Seisakusho.

A sample (pressure-adhesive sheet) was cut to a size of $20\times 150$ mm. After removing the strippable sheet, the adhesive surface was directed outwardly. Both ends (25 mm) were caused to overlap each other and held by chucks of the strograph to form a loop with a circumference of 100 mm.

The loop was then allowed to descend toward an alkyd-melamine coated plate (a product produced by Nippon Test Panel Industry, Co., Ltd.) and contact it. The loop was designed such that at this time, its contacting length became 30 mm.

When the descending of the loop ended, the sample made contact with the alkyd-melamine coated plate with the loop being collapsed.

The sample was maintained stationary in this state for 15 seconds. Then, the loop was elevated at a rate of 300 mm/min. The adhesion strength between the test sample and the alkyd-melamine coated plate was measured and defined as the loop tack.

(2) Movability on a substrate

A test piece (pressure-sensitive sheet) was cut to a size of 25×150 mm, and the strippable sheet was peeled off. One end (25 mm) was bent with the adhesive surface inwardly, and placed on an alkyd-melamine coated plate with the adhesive layer being directed downward. At this time, the test piece was not press-bonded, but allowed to receive only its own weight.

One end (bent end) of the test piece was moved to and from with the hand, and the freeness of movement was examined, and defined as movability under no load.

The result was evaluated on a scale of three grades of 0, X and Δ.

0: The test piece could be freely moved on the substrate.

Δ: Adhesion strength was developed partly, and the movement of the test piece was not free.

X: The movement of the test piece was difficult.

A load of 50 g was placed evenly on the test piece, and the movability under a load was determined in the same way as above.

(3) Developing of adhesion strength (g/cm)

A test piece (pressure-senstitive adhesive strength) was cut to a size of 10×200 mm, and the strippable sheet was removed. The remainder was press-bonded to an alkyd-melamine coated plate (a product of Nippon Test Panel Ind. Co., Ltd.) by means of a squeegee.

After the lapse of a predetermined period of time (3 minutes, 10 minutes, 2 hours, 24 hours), the test piece was pulled 180° by means of a strograph M-50 at a pulling speed of 200 mm/min. and its adhesion strength was measured.

The final adhesion strength reached was the adhesion strength measured 168 hours after the bonding.

(4) The ratio of short-term adhesion strength development

This was expressed as the percentage of the adhesion strength 10 minutes after the bonding to the final adhesion strength reached as defined in (3).

(5) Adhesion strength after water immersion

A test piece was cut to a size of 20×150 mm. After removing the strippable sheet, the test piece was press-bonded to an alkyd-melamine coated plate (a product of Nippon Test Panel Ind. Co., Ltd.) by using a squeegee.

The bonded structure was left to stand at room temperature for 72 hours, immersed in water at 40° C. for 162 hours, and taken out. After standing for a predetermined period of time (1 minute, and 72 hours) while being air-dried at 23° C., the test piece was peeled 180° at a pulling speed of 200 mm/min. by using a strogrpah M-50, and the adhesion strength was measured.

(6) Blister resistance test

The test piece was cut to a size of 60×60 mm, and the strippable sheet was removed. Then, the test piece was press-bonded to an alkyd-melamine coated plate (a product of Nippon Test Panel Ind. Co., Ltd.) by means of a squeegee.

The bonded structure was left to stand at room temperature for 30 minutes, and a mixture of 100 parts of a clear resin (Belcoat No. 5100 Clear HK produced by Nippon Oils and Fats Co., Ltd.) and 30 parts of a solvent (Belcoat No. 5100 Thinner No. 4, a product of Nippon Oils and Fats Co., Ltd.) was coated on the bonded structure. After standing at room temperature for 12 minutes, the paint was dried at 70° C. for 10 minutes and then at 150° C. for 15 minutes to form a surface coat having a thickness of 30 minutes. Twenty-four hours later, the surface condition of the coated surface was evaluated.

The evaluation was conducted on a scale of 0, Δ and X as follows:

0: The surface condition hardly changed.

Δ: About 30 blisters having a diameter of less than 0.5 mm were noted. The end of the test piece was turned over 1–2 mm.

X: Blisters were larger or more than Δ, or the end of the test piece was turned over 2 mm or more.

(7) Gasoline resistance test

The test piece was cut to a size of 60×60 mm, and the strippable sheet was removed. The test piece was press-bonded to an alkyd-melamine coated plate (a product of Nippon Test Panel Ind. Co., Ltd.) by means of a squeegee.

After standing at room temperature for 72 hours, the bonded structure was immersed in lead-free gasoline for 1 hour. It was then taken out and dried, and the surface condition was evaluated.

The evaluation was conducted on a scale of 0, Δ and X.

0: The surface conditions hardly changed.

Δ: About 30 blisters having a diameter of less than 0.5 mm were noted. The end of the test piece was turned over 1–2 mm.

X: Blisters were larger or more than Δ, or the end of the test piece was turned over 2 mm or more.

(8) Surface condition after press-bonding

The rough and smooth conditions of the surface were observed with the naked eye.

0: Smooth and good

Δ: Smoothness was poor, but no outstanding raised and depressed portions.

X: Rough, outstanding raised and depressed portions (9) Average thickness of the adhesive layer, and the thickness variation range An adhesive layer with a portion in which no non-adhesive solid particles were dispersed was prepared, and this portion was transferred to a vinyl chloride film having a thickness of 40 microns (thickness accuracy within ±0.5 micron) to prepare a sample with a size of 20 mm×200 mm.

Along the length of this sample, the thicknesses of 10 equally spaced points were measured by a dial gauge specified in JIS B7500.

A similar test piece was bonded to a slide glass, and by using a surface roughness tester (Surfcorder SE-30D made by K. K. Kosaka Kenkyusho), the "track of a contact-angle movement obtained by tracing the surface of a measuring object with a predetermined contact needle radius on the basis of the measuring track using a skid as a guide" (i.e., the curve of the sectional surface is measured). The skid was one made of sapphire [R40 mm (measuring direction)×R2 mm]. The $R_{max}$ value (maximum height) based on JIS B0601 was determined from the curve of the sectional surface and defined as the thickness variation range.

(10) Ratio of non-adhesive solid particles remaining unruptured

Solid particles to be tested were evenly sprayed on strippable paper (OKC-105 PSG-Q, a tradename for a product of Ouji Chemical Industry Co., Ltd.) at a rate of about 1 million/100 cm$^2$.

The strippable paper was heated to about 100° C. by an infrared heater, and under heating, a steel roll having a diameter of 40 mm and a length of 330 mm with a weight of 20 kg was pressed against the paper with rotation to embed the solid particles into the paper.

Then, a mixture of 100 parts of an acrylic tackifier (PE-121, a tradename for a product of Nippon Carbide Kogyo K. K.) and 1 part of a crosslinking agent (Coronate L, a tradename for a product of Japan Polyurethane Industry Co., Ltd.) was coated on the paper, and dried to form a tackifier layer having a thickness of about 35 microns.

A transparent vinyl chloride film (Hi-S Paint 5080, a tradename for a product of Nippon Carbide Kogyo K. K.) was bonded to the tackifier layer to prepare a pressure-sensitive adhesive sheet.

The strippable paper of the pressure-sensitive adhesive sheet was removed, and the sheet was lightly applied to a glass plate. Then, by using a polypropylene squeegee having a thickness of 1.5 mm and a width of 95 mm, the adhesive sheet was strongly press-bonded to the glass plate under a pressure of about 5 kg.

The solid particles were then observed with a microscope, and the state of rupture of the particles were observed. The ratio of those particles which remained unruptured was determined.

In the present invention, it is preferred to use solid particles having a remaining ratio after press-bonding of at least 80%, especially 100%.

EXAMPLE 1

Spherical solid particles (non-adhesive) having an average particle diameter of about 30 microns obtained by classifying polymer beads (weight average molecular weight about 300,000) of polymethyl methacrylate formed by suspension polymerization were evenly sprayed on strippable paper (a strippable support layer) (OKC-105 PSG-Q, a tradename for a product of Ouji Chemical Industry Co., Ltd.).

The strippable paper was heated to about 100° C. by an infrared heater, and under heating, a steel roll having a diameter of 40 mm and a length of 330 mm with a weight of 20 kg was pressed against the paper with rotation to embed the solid particles into the paper. The amount of embedding (the projecting length) of the solid particles was 14 microns, and the ratio of polymer beads covering the surface was about 8%.

Then, a mixture of 100 parts of an acrylic tackifier (PE-121, a tradename for a product of Nippon Carbide Kogyo K. K.) and 1 part of a crosslinking agent (Coronate L, a tradename for a product of Japan Polyurethane Industry Co., Ltd.) was coated on the paper, and dried to form a tackifier layer having a thickness of about 35 microns. The thickness variation range of the adhesive layer was 10 microns.

A transparent vinyl chloride film (Hi-S Paint 5080, a tradename for a product of Nippon Carbide Kogyo K. K.) was bonded to the tackifier layer to prepare a pressure-sensitive adhesive sheet.

The properties of the resulting pressure-sensitive adhesive sheet are shown in Table 1. It was free to move on a substrate, and after press-bonding, rapidly developed adhesion strength. It had a high final adhesion strength and excellent durability characteristics such as water resistance, blister resistance and gasoline resistance. After press-bonding, the surface condition of the sheet was very good. Thus, this adhesive sheet can fully achieve the objects of this invention.

COMPARATIVE EXAMPLES 1-2

In each run, a pressure-sensitive sheet was produced as in Example 1 except that solid particles having an average particle diameter of 63 microns (Comparative Example 1) or solid particles having an average particle diameter of 8 microns (Comparative Example 2) were used instead of the solid particles used in Example 1.

As shown in Table 1, the sheet obtained in Comparative Example 1 had a very poor surface condition after press-bonding and exhibited low resistance to blister and gasoline.

The sheet obtained in Comparative Example 2 had difficulty of movement on a substrate.

These adhesive sheets cannot achieve the objects of the invention.

EXAMPLE 2

A pressure-sensitive adhesive sheet was prepared in the same way as in Example 1 except that glass microballoons having an average particle diameter of 28 microns (remaining ratio after rupture 100%) obtained by classification were used instead of the polymer beads.

The resulting sheet can fully achieve the objects of the invention, as shown in Table 1.

EXAMPLE 3

A pressure-sensitive adhesive sheet was prepared in the same way as in Example 1 except that glass beads having an average particle diameter of 33 microns (remaining ratio after rupture 100%) obtained by classification were used instead of the polymer beads.

The resulting sheet can fully achieve the objects of the invention, as shown in Table 1.

COMPARATIVE EXAMPLE 3

A pressure-sensitive adhesive sheet was produced in the same way as in Example 1 except that by adjusting the load of the steel roll, the amount of the polymer beads embedded was changed to about 6 microns.

The resulting sheet had difficulty of movement on a substrate, and cannot achieve the objects of the present invention.

COMPARATIVE EXAMPLE 4

A pressure-sensitive adhesive sheet was produced in the same way as in Example 2 except that fragile and collapsible glass balloons having an average particle diameter of about 50 microns obtained by dispersion were used instead of the solid particles used in Example 2.

The resulting sheet had a poor surface condition after press-bonding, and unsatisfactory durability properties such as blister resistance and gasoline resistance, as shown in Table 1. It cannot achieve the objects of this invention.

EXAMPLES 4-5

In each run, a pressure-sensitive adhesive sheet was produced in the same way as in Example 1 except that polymer beads having an average particle diameter of about 22 microns (Example 4) or polymer beads having an average particle diameter of about 39 microns (Example 5) were used instead of the polymer beads used in Example 1.

The adhesive sheets obtained in Examples 4 and 5 can fully achieve the objects of this invention.

EXAMPLE 6

A pressure-sensitive adhesive sheet was produced in the same way as in Example 1 except that the amount of embedding of the polymer beads was changed to about 8 microns by adjusting the load of the steel roll.

The adhesive sheet can fully achieve the objects of this invention as shown in Table 1.

EXAMPLES 7-8

In each run, a pressure-sensitive adhesive sheet was produced in the same way as in Example 1 except that by varying the amount of the polymer beads sprayed, the ratio of the solid particles covering the surface was changed to about 5% (Example 7) or about 18% (Example 8).

The resulting sheets can fully achieve the objects of this invention as shown in Table 1.

COMPARATIVE EXAMPLE 5

Fine particles of calcium carbonate having an average particle diameter of about 0.6 micron ("NCC#410", a tradename for a product of Nitto Powderization Industry Co., Ltd.) were dispersed on strippable paper ("KOM-11", a tradename for a product of Shikoku PaperMaking Co., Ltd.). In dispersing, the calcium carbonate particles were scattered excessively on the strippable paper, and uniformly dispersed on the surface by a brush. The excess of the particles was scraped off by a scraper. The amount of the calcium carbonate distributed was about 1 g/m$^2$.

A mixture of 100 parts of an acrylic tackifier (PE-121, a tradename for a product of Nippon Carbide Kogyo K.K.) and 1 part of a crosslinking agent (Coronate L, a tradename for a product of Japan Polyurethane Industry Co., Ltd.) was coated on the paper, and dried to form a tackifier layer having a thickness of about 35 microns. The thickness variation range was 10 microns.

A transparent vinyl chloride film (Hi-S Paint 5080, a tradename for a product of Nippon Carbide Kogyo K.K.) was bonded to the tackifier layer to prepare a pressure-sensitive adhesive sheet.

As shown in Table 1, the resulting sheet had a low ratio of short-term adhesion strength development and was outside the scope of the invention.

TABLE 1

| | Non-adhesive solid particles | | | Adhesive | | Ratio of the solid particles covering the surface (%) | Projecting length of the solid particles (μ) | Loop tack (g/cm) | Movability on a substrate | |
|---|---|---|---|---|---|---|---|---|---|---|
| | Material | Average diameter (μ) | Ratio of particles remaining unruptured (%) | Average thickness (μ) | Thickness variation range (μ) | | | | Under no load | Under load |
| Ex. 1 | MMA(*) | 30 | 100 | 35 | 10 | 8 | 14 | O | O | O |
| Ex. 2 | Glass balloons | 28 | 100 | 35 | 10 | 8 | 13 | O | O | O |
| Ex. 3 | Glass beads | 33 | 100 | 37 | 11 | 8 | 16 | O | O | O |
| Ex. 4 | MMA | 22 | 100 | 35 | 10 | 8 | 11 | O | O | O |
| Ex. 5 | " | 39 | 100 | 35 | 10 | 8 | 18 | O | O | O |
| Ex. 6 | " | 30 | 100 | 35 | 10 | 8 | 8 | O | O | O |
| Ex. 7 | " | 30 | 100 | 35 | 10 | 5 | 14 | O | O | O |
| Ex. 8 | " | 30 | 100 | 35 | 10 | 18 | 14 | O | O | O |
| CEx. 1 | " | 63 | 100 | 35 | 10 | 8 | 27 | O | O | O |
| CEx. 2 | " | 8 | 100 | 35 | 10 | 8 | 5 | 485 | Δ | X |
| CEx. 3 | " | 30 | 100 | 35 | 10 | 8 | 6 | 490 | Δ | X |
| CEx. 4 | Glass balloons | 50 | 23 | 35 | 10 | 8 | 16 | O | O | O |
| CEx. 5 | Calcium carbonate | 0.6 | 100 | 35 | 0 | 85 | 10 | O | O | Δ |

| | Developing of adhesion strength (g/cm) after press-bonding | | | | Final adhesion strength reached | Ratio of short-term adhesion strength development (%) | Water-resistant adhesion strength Air-drying | | Blister resistance test | Gasoline resistance test | Surface condition after press-bonding |
|---|---|---|---|---|---|---|---|---|---|---|---|
| | 3 min. | 10 min. | 2 hours | 24 hours | | | 1 min. | 72 hours | | | |
| Ex. 1 | 490 | 550 | 570 | 640 | 730 | 75 | 600 | 710 | O | O | O |
| Ex. 2 | 470 | 500 | 550 | 590 | 670 | 75 | 500 | 600 | O | O | O |
| Ex. 3 | 500 | 530 | 560 | 620 | 720 | 74 | 610 | 700 | O | O | O |
| Ex. 4 | 500 | 560 | 560 | 650 | 750 | 75 | 620 | 730 | O | O | O |
| Ex. 5 | 470 | 480 | 550 | 600 | 680 | 71 | 600 | 670 | O | O | O |
| Ex. 6 | 500 | 560 | 580 | 630 | 720 | 78 | 610 | 700 | O | O | O |
| Ex. 7 | 530 | 570 | 610 | 690 | 760 | 75 | 630 | 710 | O | O | O |
| Ex. 8 | 370 | 450 | 490 | 540 | 640 | 70 | 580 | 650 | O | O | O |
| CEx. 1 | 290 | 330 | 350 | 400 | 440 | 75 | 360 | 400 | X | X | X |
| CEx. 2 | 580 | 590 | 640 | 690 | 770 | 77 | 600 | 730 | O | O | O |
| CEx. 3 | 580 | 600 | 640 | 700 | 790 | 76 | 620 | 740 | O | O | O |
| CEx. 4 | 420 | 440 | 500 | 530 | 600 | 73 | 320 | 460 | X | X | X |
| CEx. 5 | 80 | 170 | 380 | 660 | 890 | 19 | 600 | 720 | X | O | O |

(*): Poly(methyl methacrylate)

We claim:

1. A pressure-sensitive adhesive sheet structure comprising (A) a pressure-sensitive adhesive layer having, on at least one surface thereof, a layer of evenly dispersed non-adhesive solid particles having an average particle diameter of 10 to 60 microns, wherein at least about half of the solid particles project from the surface of the adhesive layer to a height corresponding to at least about one-fourth of the average particle diameter of the solid particles, and if the solid particles are hollow particles, the walls of the hollow particles are not rupturable by the pressure of bonding, (B) a strippable support layer contacting the projecting portions of the non-adhesive solid particles on the surface of the adhesive layer and having depressions on the surface intimately receiving the projecting portions of the solid particles, and (C) a substrate layer laminated to that surface of the pressure-sensitive adhesive layer which does not have the layer of the dispersed solid particles.

2. The structure of claim 1 which is for use in marking.

3. The pressure-sensitive adhesive structure of claim 1 in which the ratio of the area of the non-adhesive solid particles covering the surface of the adhesive layer based on the surface area of the latter is about 1 to 30%, and in which the non-adhesive solid particles have an average particle diameter of about 10 to 40 microns.

4. The pressure-sensitive adhesive structure of claim 4 in which the adhesive layer has a thickness of from about 20 to 50 microns and wherein at least about half of the non-adhesive solid particles project from the surface of the adhesive layer to a height of at least about 7 microns.

* * * * *